US010889147B2

(12) United States Patent
Chatard et al.

(10) Patent No.: US 10,889,147 B2
(45) Date of Patent: Jan. 12, 2021

(54) RUBBER COMPOSITION COMPRISING A SPECIFIC HYDROCARBONATED RESIN

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Julien Chatard, Clermont-Ferrand (FR); Benoit De Gaudemaris, Clermont-Ferrand (FR); Alain Hut, Clermont-Ferrand (FR); Fabien Hellot, Clermont-Ferrand (FR); Francois Dimier, Clermont-Ferrand (FR)

(73) Assignee: Compagnie Generale Des Etablissements Michelin, Clermont-Ferrand (FR)

(*) Notice: Subject to any disclaimer, the term of this patent is extended or adjusted under 35 U.S.C. 154(b) by 269 days.

(21) Appl. No.: 15/538,687

(22) PCT Filed: Dec. 18, 2015

(86) PCT No.: PCT/EP2015/080421
§ 371 (c)(1),
(2) Date: Jun. 22, 2017

(87) PCT Pub. No.: WO2016/102344
PCT Pub. Date: Jun. 30, 2016

(65) Prior Publication Data
US 2018/0001702 A1 Jan. 4, 2018

(30) Foreign Application Priority Data

Dec. 22, 2014 (FR) ..................... 14 63078

(51) Int. Cl.
| | | |
|---|---|---|
| B60C 1/00 | (2006.01) | |
| C08L 7/00 | (2006.01) | |
| C08L 9/00 | (2006.01) | |
| C08F 236/10 | (2006.01) | |
| C08L 45/00 | (2006.01) | |
| C08K 3/04 | (2006.01) | |
| C08K 3/06 | (2006.01) | |
| C08K 5/09 | (2006.01) | |
| C08K 5/18 | (2006.01) | |
| C08K 5/47 | (2006.01) | |
| C08K 3/22 | (2006.01) | |

(52) U.S. Cl.
CPC .......... *B60C 1/0016* (2013.01); *C08F 236/10* (2013.01); *C08L 7/00* (2013.01); *C08L 9/00* (2013.01); *C08L 45/00* (2013.01); *C08F 2500/02* (2013.01); *C08F 2500/04* (2013.01); *C08K 3/04* (2013.01); *C08K 3/06* (2013.01); *C08K 5/09* (2013.01); *C08K 5/18* (2013.01); *C08K 5/47* (2013.01); *C08K 2003/2296* (2013.01)

(58) Field of Classification Search
CPC .. B60C 1/0016; C08F 236/10; C08F 2500/04; C08F 2500/02; C08L 7/00; C08L 9/00; C08L 45/00
See application file for complete search history.

(56) References Cited

U.S. PATENT DOCUMENTS

| | | | |
|---|---|---|---|
| 5,227,425 A | 7/1993 | Rauline | 524/493 |
| 5,852,099 A | 12/1998 | Vanel | 524/494 |
| 5,900,449 A | 5/1999 | Custodero et al. | 524/430 |
| 6,420,488 B1 | 7/2002 | Penot | 525/332.7 |
| 6,536,492 B2 | 3/2003 | Vasseur | 152/450 |
| 6,774,255 B1 | 8/2004 | Tardivat et al. | 556/427 |
| 7,217,751 B2 | 5/2007 | Durel et al. | 524/262 |
| 7,250,463 B2 | 7/2007 | Durel et al. | 524/492 |
| 7,300,970 B2 | 11/2007 | Durel et al. | 524/493 |
| 7,488,768 B2 | 2/2009 | Tardivat et al. | 524/262 |
| 7,491,767 B2 | 2/2009 | Durel et al. | 524/493 |
| 7,820,771 B2 | 10/2010 | Lapra et al. | 525/479 |
| 8,492,475 B2 | 7/2013 | Araujo Da Silva et al. | 524/552 |
| 8,735,500 B2 | 5/2014 | Barbee et al. | 525/211 |
| 8,883,929 B2 | 11/2014 | Gandon-Pain et al. | 525/326.5 |
| 10,214,638 B2 | 2/2019 | Belin et al. | |
| 2001/0034389 A1 | 10/2001 | Vasseur | 524/137 |
| 2004/0051210 A1 | 3/2004 | Tardivat et al. | 264/349 |
| 2004/0132880 A1 | 7/2004 | Durel et al. | 524/262 |
| 2005/0004297 A1 | 1/2005 | Durel et al. | 524/493 |

(Continued)

FOREIGN PATENT DOCUMENTS

| | | |
|---|---|---|
| CN | 106232703 A | 12/2016 |
| EP | 0 501 227 A1 | 9/1992 |

(Continued)

OTHER PUBLICATIONS

Escorez 1102 Product Datasheet, https://www.exxonnnobilchemical.com/en/chemicals/webapi/dps/v1/datasheets/150000100573/0/en, downloaded on May 8, 2020, 2 pages, document dated May 5, 2020.*

R. Mildenberg, M Zander & G. Collin, Hydrocarbon Resins 67-70 (1997).*

Agilent Technologies, Polymer Molecular Weight Distribution and Definitions of MW Averages, Technical Overview, 4 pages, Apr. 30, 2015.*

(Continued)

*Primary Examiner* — Nicholas E Hill
(74) *Attorney, Agent, or Firm* — Venable LLP

(57) ABSTRACT

A rubber composition is based on at least one diene elastomer, a reinforcing filler, a crosslinking system and a hydrocarbon-based resin. The hydrocarbon-based resin has a number-average molecular weight (Mn) of between 700 and 1000 g/mol, an average molecular weight Mz of greater than 6000 g/mol and a polydispersity index (PI) of greater than 2.4.

16 Claims, No Drawings

(56) References Cited

U.S. PATENT DOCUMENTS

| | | | |
|---|---|---|---|
| 2005/0016650 A1 | 1/2005 | Durel et al. | 152/209.1 |
| 2005/0016651 A1 | 1/2005 | Durel et al. | 152/209.1 |
| 2008/0132644 A1 | 6/2008 | Lapra et al. | 525/105 |
| 2009/0186961 A1 | 7/2009 | Araujo Da Silva et al. | 523/150 |
| 2009/0234066 A1 | 9/2009 | Araujo Da Silva et al. | 524/571 |
| 2009/0270558 A1 | 10/2009 | Gandon-pain et al. | 525/190 |
| 2010/0022714 A1 | 1/2010 | Varagniat et al. | 525/209 |
| 2010/0179247 A1* | 7/2010 | Vest | C08L 21/00 523/150 |
| 2011/0152458 A1 | 6/2011 | Araujo Da Silva et al. | 525/102 |
| 2012/0208948 A1 | 8/2012 | Gandon-Pain et al. | 524/521 |
| 2012/0289647 A1* | 11/2012 | Koelle | B29B 7/7495 524/525 |
| 2013/0196085 A1 | 8/2013 | Voge et al. | 428/12 |
| 2013/0211027 A1 | 8/2013 | Barbee et al. | 526/283 |
| 2017/0121509 A1 | 5/2017 | Belin et al. | |

FOREIGN PATENT DOCUMENTS

| | | |
|---|---|---|
| EP | 0 735 088 A1 | 10/1996 |
| EP | 0 810 258 A1 | 12/1997 |
| FR | 2 955 588 A1 | 7/2011 |
| WO | 94/01295 A1 | 1/1994 |
| WO | 97/36724 A2 | 10/1997 |
| WO | 99/16600 A1 | 4/1999 |
| WO | 00/05300 A1 | 2/2000 |
| WO | 00/05301 A1 | 2/2000 |
| WO | 02/30939 A1 | 4/2002 |
| WO | 02/31041 A1 | 4/2002 |
| WO | 02/083782 A1 | 10/2002 |
| WO | 03/002648 A1 | 1/2003 |
| WO | 03/002649 A1 | 1/2003 |
| WO | 03/16387 A1 | 2/2003 |
| WO | 2006/069792 A1 | 7/2006 |
| WO | 2006/069793 A1 | 7/2006 |
| WO | 2006/125532 A1 | 11/2006 |
| WO | 2006/125533 A1 | 11/2006 |
| WO | 2006/125534 A1 | 11/2006 |
| WO | 2008/003434 A1 | 1/2008 |
| WO | 2008/003435 A1 | 1/2008 |
| WO | 2012/050658 A1 | 4/2012 |

OTHER PUBLICATIONS

R. Mildenberg, et al., "Resin Manufacture", Hydrocarbon Resins, VCH, chapter 3, pp. 17-39 (1997).

Office Action dated Feb. 9, 2018, in corresponding CN application 201580065103.9 (12 pages).

* cited by examiner

RUBBER COMPOSITION COMPRISING A SPECIFIC HYDROCARBONATED RESIN

FIELD OF THE INVENTION

The invention relates to compositions, especially for tyres and more particularly to compositions comprising a specific hydrocarbon-based resin to improve the tack of the composition before curing.

RELATED ART

The ability of rubber compositions to be tacky before curing is an indispensable property for manufacturing tyres. This is because, in order to manufacture tyres, it is necessary to be able to apply the different layers of the tyre on one another and for the layers to adhere to one another, before curing of the tyre, which curing will connect the layers to one another by crosslinking. This property of tack of the composition before curing is also referred to as "tack in the uncured state" or "tack" or "green tack".

Recent developments in tyres with low rolling resistance have led tyre manufacturers to substantially modify the rubber compositions of their tyres. This development of mixtures with low rolling resistance is generally accompanied by a reduction in the green tack. This is because the tackifying resins used to increase the green tack are generally accompanied by an increase in hysteresis. The other solution for increasing the green tack, using rubber cement solvent, has the drawback of releasing volatile organic compounds.

At present, the applicants have shown that a particular composition comprising a specific hydrocarbon-based resin makes it possible to have a very good green tack and low rolling resistance.

BRIEF DESCRIPTION OF EMBODIMENTS OF THE INVENTION

The invention therefore relates to a rubber composition based on at least one diene elastomer, a reinforcing filler, a crosslinking system and a hydrocarbon-based resin, said hydrocarbon-based resin having a number-average molecular weight (Mn) of between 700 and 1000 g/mol, an average molecular weight Mz of greater than 6000 g/mol and a polydispersity index (PI) of greater than 2.4.

The invention preferentially relates to a compound as defined above, in which said diene elastomer is selected from the group consisting of essentially unsaturated diene elastomers. Said diene elastomer is preferentially selected from the group consisting of polybutadienes, synthetic polyisoprenes, natural rubber, butadiene copolymers, isoprene copolymers and the mixtures of these elastomers. More preferentially, the predominant diene elastomer is selected from the group consisting of polybutadienes, copolymers of butadiene and styrene, and natural rubber.

Also preferentially, the invention relates to a composition as defined above in which the reinforcing filler is selected from the group consisting of silicas, carbon blacks and the mixtures thereof. More preferentially, the content of reinforcing filler is within a range extending from 5 to 200 phr and preferably from 40 to 160 phr.

The invention preferably relates to a composition as defined above in which the content of said hydrocarbon-based resin is within a range extending from 1 to 15 phr, preferably from 2 to 12 phr. More preferentially, the content of said hydrocarbon-based resin is within a range extending from 3 to 10 phr and preferably from 3 to 8 phr.

The invention preferentially relates to a composition as defined above, in which said hydrocarbon-based resin has an Mn of between 800 and 1000 g/mol.

Also preferentially, the invention relates to a composition as defined above, in which said hydrocarbon-based resin has an Mz within a range extending from 6000 to 8000 g/mol.

Also preferably, the invention relates to a composition as defined above, in which said hydrocarbon-based resin has a PI within a range extending from 2.4 to 2.8.

The invention preferentially relates to a composition as defined above, in which the resin is selected from the group consisting of aliphatic hydrocarbon-based resins and mixtures thereof.

According to a preferential variant, the invention relates to a composition as defined above, additionally comprising a plasticizing system. The plasticizing system preferably comprises a hydrocarbon-based resin with a Tg of greater than 20° C. and/or a plasticizing oil.

The invention also relates to a tyre comprising a composition as defined above.

The tyre according to the invention will preferentially be selected from the tyres intended to equip a two-wheel vehicle, a passenger vehicle, or else a "heavy-duty" vehicle (that is to say, underground, bus, off-road vehicles, heavy road transport vehicles, such as lorries, tractors or trailers), or else aircraft, construction equipment, heavy agricultural vehicles or handling vehicles.

DETAILED DESCRIPTION OF EMBODIMENTS OF THE INVENTION

I—Constituents of the Composition

The rubber compositions according to the invention are based on at least one diene elastomer, a reinforcing filler, a crosslinking system and a specific hydrocarbon-based resin, said hydrocarbon-based resin having a number-average molecular weight (Mn) of between 700 and 1000 g/mol, an average molecular weight Mz of greater than 6000 g/mol and a polydispersity index (PI) of greater than 2.4.

The expression "composition based on" should be understood as meaning a composition comprising the mixture and/or the product of the in situ reaction of the various base constituents used, some of these constituents being able to react and/or being intended to react with one another, at least partially, during the various phases of manufacture of the composition or during the subsequent curing, modifying the composition as it is prepared at the start. Thus, the compositions as employed for the invention can be different in the non-crosslinked state and in the crosslinked state.

In the present description, unless expressly indicated otherwise, all the percentages (%) shown are percentages by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

I-1 Diene Elastomer

The compositions may contain just one diene elastomer or a mixture of several diene elastomers.

It is recalled here that elastomer (or "rubber", the two terms being regarded as synonymous) of the "diene" type should be understood, in a known way, to mean an (one or more is understood) elastomer resulting at least in part (i.e., a homopolymer or a copolymer) from diene monomers (monomers bearing two conjugated or non-conjugated carbon-carbon double bonds).

Diene elastomers can be classified into two categories: "essentially unsaturated" or "essentially saturated". "Essentially unsaturated" is generally understood to mean a diene elastomer resulting at least in part from conjugated diene monomers having a content of units of diene origin (conjugated dienes) which is greater than 15% (mol %); thus, diene elastomers such as butyl rubbers or copolymers of dienes and of α-olefins of EPDM type do not fall under the preceding definition and can especially be described as "essentially saturated" diene elastomers (low or very low content, always less than 15%, of units of diene origin). In the category of "essentially unsaturated" diene elastomers, a "highly unsaturated" diene elastomer is understood in particular to mean a diene elastomer having a content of units of diene origin (conjugated dienes) which is greater than 50%.

Given these definitions, diene elastomer capable of being used in the compositions according to the invention is understood more particularly to mean:
(a) any homopolymer obtained by polymerization of a conjugated diene monomer having from 4 to 12 carbon atoms;
(b) any copolymer obtained by copolymerization of one or more conjugated dienes with one another or with one or more vinylaromatic compounds having from 8 to 20 carbon atoms;
(c) a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, especially, 1,4-hexadiene, ethylidenenorbornene or dicyclopentadiene;
(d) a copolymer of isobutene and of isoprene (butyl rubber) and also the halogenated versions, in particular chlorinated or brominated versions, of this type of copolymer.

Although it applies to any type of diene elastomer, those skilled in the art of tyres will understand that the present invention is preferably employed with essentially unsaturated diene elastomers, in particular of the above type (a) or (b).

The following are especially suitable as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, especially on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalization agent. "Function" here is preferentially understood to mean a chemical group which interacts with the reinforcing filler of the composition.

To summarize, the diene elastomer of the composition is preferably selected from the group of highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably selected from the group consisting of butadiene/styrene (SBR) copolymers.

Thus, the invention preferably relates to compositions in which the elastomer said diene elastomer is selected from the group consisting of essentially unsaturated diene elastomers, and especially from the group consisting of polybutadienes, synthetic polyisoprenes, natural rubber, butadiene copolymers, isoprene copolymers and the mixtures of these elastomers. The predominant diene elastomer is preferentially selected from the group consisting of polybutadienes, copolymers of butadiene and styrene, and natural rubber.

I-2 Reinforcing Filler

The composition according to the invention comprises a reinforcing filler. Use may be made of any type of reinforcing filler known for its abilities to reinforce a rubber composition which can be used for the manufacture of tyres, for example an organic filler, such as carbon black, a reinforcing inorganic filler, such as silica or alumina, or else a blend of these two types of filler.

All carbon blacks, especially "tyre-grade" blacks, are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example N660, N683 or N772). The carbon blacks might, for example, be already incorporated in an isoprene elastomer in the form of a masterbatch (see, for example, Applications WO 97/36724 or WO 99/16600).

Mention may be made, as examples of organic fillers other than carbon blacks, of functionalized polyvinyl organic fillers, such as described in Applications WO-A-2006/069792, WO-A-2006/069793, WO-A-2008/003434 and WO-A-2008/003435.

The composition can contain one type of silica or a blend of several silicas. The silica used can be any reinforcing silica known to those skilled in the art, especially any precipitated or fumed silica having a BET surface area and a CTAB specific surface area both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber, treated precipitated silicas, such as, for example, the silicas "doped" with aluminium described in Application EP-A-0735088, or the silicas with a high specific surface area as described in Application WO 03/16837.

The silica preferably has a BET surface area of between 45 and 400 $m^2/g$, more preferentially of between 60 and 300 $m^2/g$.

These compositions can optionally also contain, in addition to the coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes, polyols, fatty acids, polyethers, primary, secondary or tertiary amines, or hydroxylated or hydrolysable polyorganosiloxanes.

Use is especially made of silane polysulphides, referred to as "symmetrical" or "asymmetrical" depending on their specific structure, such as described, for example, in Applications WO 03/002648 (or US 2005/016651) and WO 03/002649 (or US 2005/016650).

Suitable in particular, without the definition below being limiting, are silane polysulphides referred to as "symmetrical", corresponding to the following general formula (III):

Z-A-Sx-A-Z, in which: (III)

x is an integer from 2 to 8 (preferably from 2 to 5);
A is a divalent hydrocarbon radical (preferably $C_1$-$C_{18}$ alkylene groups or $C_6$-$C_{12}$ arylene groups, more particularly $C_1$-$C_{10}$ alkylenes, in particular $C_1$-$C_4$ alkylenes, especially propylene);
Z corresponds to one of the formulae below:

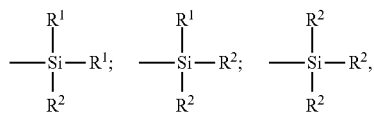

in which:
the R1 radicals, which are substituted or unsubstituted and identical to or different from one another, represent a C1-C18 alkyl, C5-C18 cycloalkyl or C6-C18 aryl group (preferably C1-C6 alkyl, cyclohexyl or phenyl groups, especially C1-C4 alkyl groups, more particularly methyl and/or ethyl).
the R2 radicals, which are substituted or unsubstituted and identical to or different from one another, represent a C1-C18 alkoxy or C5-C18 cycloalkoxy group (preferably a group chosen from C1-C8 alkoxys and C5-C8 cycloalkoxys, more preferentially still a group chosen from C1-C4 alkoxys, in particular methoxy and ethoxy).

In the case of a mixture of alkoxysilane polysulphides corresponding to the above formula (III), especially normal commercially available mixtures, the mean value of the "x" indices is a fractional number preferably of between 2 and 5, more preferentially of close to 4. However, the invention may also be advantageously carried out, for example, with alkoxysilane disulphides (x=2).

Mention will more particularly be made, as examples of silane polysulphides, of bis((C1-C4)alkoxy(C1-C4)alkylsilyl(C1-C4)alkyl) polysulphides (especially disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, of formula $[(C_2H_5O)_3Si(CH_2)_3S_2]_2$, or bis(triethoxysilylpropyl) disulphide, abbreviated to TESPD, of formula $[(C_2H_5O)_3Si(CH_2)_3S]_2$. Mention will also be made, as preferential examples, of bis(mono(C1-C4)alkoxyldi(C1-C4)alkylsilylpropyl) polysulphides (especially disulphides, trisulphides or tetrasulphides), more particularly bis(monoethoxydimethylsilylpropyl) tetrasulphide, such as described in Patent Application WO 02/083782 (or US 2004/132880).

Mention will also be made, as coupling agent other than alkoxysilane polysulphide, of bifunctional POSs (polyorganosiloxanes), or else of hydroxysilane polysulphides (R2=OH in the above formula III), such as described in Patent Applications WO 02/30939 (or U.S. Pat. No. 6,774, 255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

In the rubber compositions in accordance with the invention, the content of coupling agent is preferentially between 1 and 15 phr, more preferably between 3 and 14 phr.

Those skilled in the art will understand that, as filler equivalent to silica described in the present section, use might be made of a reinforcing filler of another, especially organic, nature, provided that this reinforcing filler is covered with a layer of silica or else comprises functional sites, in particular hydroxyl sites, at its surface which require the use of a coupling agent in order to form the bond between the filler and the elastomer.

The physical state in which the reinforcing filler is provided is not important, whether it is in the form of a powder, of micropearls, of granules, of beads or any other appropriate densified form.

For the purposes of the invention, the content of total reinforcing filler (carbon black and/or reinforcing inorganic filler, such as silica) is from 5 to 200 phr, more preferentially from 40 to 160 phr. Below 5 phr of filler the composition might not be sufficiently reinforced, whereas above 200 phr of filler the composition might have poorer performance with regard to rolling resistance.

I-3 Crosslinking System

In the composition of the invention, any type of crosslinking system known to those skilled in the art for rubber compositions may be used.

The crosslinking system is preferably a vulcanization system, that is to say based on sulphur (or a sulphur donor agent) and a primary vulcanization accelerator. Various known secondary vulcanization accelerators or vulcanization activators, such as zinc oxide, stearic acid or equivalent compounds, or guanidine derivatives (in particular diphenylguanidine), may be added to this base vulcanization system, being incorporated during the first non-productive phase and/or during the productive phase, as described subsequently.

The sulphur is used at a preferential content of between 0.5 and 10 phr, more preferably of between 0.5 and 5 phr, in particular between 0.5 and 3 phr.

The vulcanization system of the composition according to the invention may also comprise one or more additional accelerators, for example compounds of the family of the thiurams, zinc dithiocarbamate derivatives, sulphenamides, guanidines or thiophosphates. Use may in particular be made of any compound capable of acting as accelerator for the vulcanization of diene elastomers in the presence of sulphur, in particular accelerators of the thiazole type, and also their derivatives, and accelerators of thiuram and zinc dithiocarbamate type. These accelerators are more preferentially selected from the group consisting of 2-mercaptobenzothiazyl disulphide (abbreviated to MBTS), N-cyclohexyl-2-benzothiazolesulphenamide (abbreviated to CBS), N,N-dicyclohexyl-2-benzothiazolesulphenamide (abbreviated to DCBS), N-(tert-butyl)-2-benzothiazolesulphenamide (abbreviated to TBBS), N-(tert-butyl)-2-benzothiazolesulphenimide (abbreviated to TBSI), zinc dibenzyldithiocarbamate (abbreviated to ZBEC) and the mixtures of these compounds. Preferably, use is made of a primary accelerator of the sulphenamide type.

I-4 Specific Hydrocarbon-Based Resin

The composition according to the invention comprises a specific hydrocarbon-based resin. This hydrocarbon-based resin has a number-average molecular weight (Mn) of between 700 and 1000 g/mol, an average molecular weight Mz of greater than 6000 g/mol and a polydispersity index (PI) of greater than 2.4. The Mn, Mz and PI are measured by the technique of size exclusion chromatography (SEC) according to the methods defined below.

As is well known to those skilled in the art, the hydrocarbon-based resins are prepared by polymerization. The manufacture of these resins is especially described in "Hydrocarbon Resin" by R. Mildenberg, M. Zander and G. Collin, especially in chapter 3. This manufacture takes place in four steps, of selection and pretreatment of the feedstocks (washing, distillation), of polymerization of the feedstocks (cationically or thermally), of neutralization and of separation of the resin, which may be carried out by distillation or stripping. It is described that the synthesis parameters which may have an impact on the characteristics of the resin are, inter alia, the nature of the constituents of the feedstock which is polymerized, the type of polymerization process (batchwise or continuous), the polymerization reaction time, the amount of initiation reagent and the conditions for separation of the resin.

For example, during the separation step, the resin is separated from the unreacted feedstock, consisting of low-weight molecules. This separation is conventionally carried out by vacuum distillation. The temperature and the pressure thus make it possible to adjust the minimum molecular weight of the resin. Thus, this step makes it possible to modify the molecular weight distribution of the resin. It is thus known to those skilled in the art that adjustments to the manufacturing parameters make it possible to obtain diverse characteristics for the resins prepared.

Numerous hydrocarbon-based resins are also available commercially. These resins may have characteristics, especially of Mn, Mz and PI, which differ depending on the suppliers, and sometimes on the batch under the same trade name. Thus, measuring specific parameters of the prepared or commercially available resins makes it possible to choose the resin for the invention, the latter having to have the specific properties of Mn, Mz and PI described in the present application.

The macrostructure (Mw, Mn, PI and Mz) of the hydrocarbon-based resin is determined by size exclusion chromatography (SEC) on the basis of standards ISO 16014 (*Determination of average molecular mass and molecular mass distribution of polymers using size exclusion chromatography*), ASTM D5296 (*Molecular Weight Averages and molecular weight distribution of polystyrene by High performance size exclusion chromatography*), and DIN 55672 (size exclusion chromatography).

For these measurements, the resin sample is dissolved in non-antioxidized tetrahydrofuran up to a concentration of 1.5 g/l. The solution is filtered with a Teflon filter with a porosity of 0.45 µm, using for example a disposable syringe fitted with a filter. A volume of 100 µl is injected through a set of size exclusion chromatography columns. The mobile phase is eluted at a flow rate of 1 ml/min. The columns are thermostatically controlled at 35° C. in an oven. Detection is carried out by a refractometer thermostatically controlled at 35° C. The stationary phase of the columns is based on a polystyrene divinylbenzene gel with controlled porosity.

The polymer chains are separated according to the space that they occupy when they are dissolved in the solvent: the larger the volume they occupy, the less the pores of the column are accessible to them and the shorter their elution time.

A Moore calibration curve connecting the logarithm of the molar mass (log M) with the elution time (te) is produced beforehand with polystyrene standards and modelled using a third degree polynomial. Log (molar mass of polystyrene) =a+b te+c te2+d te3.

For the calibration curve, polystyrene standards with narrow molecular distributions are used (polydispersity index, PI, of less than or equal to 1.1). The range of molar masses of these standards extends from 160 to approximately 70 000 g/mol. These standards may be grouped together in "families" of 4 or 5 standards having a log M increment of approximately 0.55 between each family.

Use may be made of certified (ISO 13885 and DIN 55672) standards kits such as, for example, the kits of vials from PSS (polymer standard service, reference PSS-pskitr1l-3), and also an additional standard PS with Wp=162 g/mol (Interchim, reference 178952). These kits are in the form of 3 vials each containing a family of polystyrene standards in suitable amounts:

Black vial: Wp=1 220, 4 850, 15 500 and 67 500 g/mol.
Blue vial: Wp=376, 3 470, 10 400, 46 000 g/mol.
Yellow vial: Wp=266, 1 920, 7 200, 28 000 g/mol.
PS162: Wp=162 g/mol.

The number-average molar mass (Mn), weight-average molar mass (Mw), the Mz and the polydispersity of the resin analysed are calculated from this calibration curve. This is why reference is made to molar masses relative to a polystyrene calibration.

For the calculation of the average masses and the PI, the limits of integration of the product elution are defined on the chromatogram corresponding to the injection of the sample. The refractometric signal defined between the two limits of integration is "cut" every second. For each of these "elementary cuts", the elution time ti and the area of the signal from the detector Ai are read off.

It is recalled here that: PI=Mw/Mn with Mw being the weight-average molecular weight and Mn being the number-average molecular weight. It is also recalled that the weights Mw, Mn and Mz are average weights calculated according to the following formulae:

$$MZ = \frac{\sum Ai * Mi^2}{\sum Ai * Mi}$$

$$Mn = \frac{\sum Ai}{\sum \frac{Ai}{Mi}}$$

$$Mw = \frac{\sum Ai * Mi}{\sum Ai}$$

in which Ai is the amplitude of the signal from the refractometric detector corresponding to the weight Mi and to the elution time ti.

The equipment used for the SEC measurement is a liquid chromatography system, for example the Waters Alliance 2690 system comprising a pump, a degasser and an injector; a differential refractometer (for example the Waters 2410 refractometer), software for acquiring and processing the data, for example the Waters Empower software, a column oven, for example the Waters "Columns Heater Module" and 4 columns mounted in series in the following order:

| Number | Brand | Range of molar masses (g/mol) | Length (mm) | Internal diameter (mm) | Particle size (μm) | Trade name | References (for information only) |
|---|---|---|---|---|---|---|---|
| Columns 1 and 2 | Polymer Laboratories | 200-400000 | 300 | 7.5 | 5 | MIXED-D | PL1110-6504 |
| Columns 3 and 4 | Polymer Laboratories | 200-30000 | 300 | 7.5 | 3 | MIXED-E | PL1110-6300 |

The commercial resins below were analysed using the method described above in order to determine their characteristics; Table 1 summarizes the results obtained.

TABLE 1

|  | Mn (g/mol) | Mz (g/mol) | PI |
|---|---|---|---|
| Resin 1 (1) | 1830 | 7200 | 2.1 |
| Resin 2 (2) | 1344 | 8835 | 2.6 |
| Resin 3 (3) | 895 | 4228 | 2 |
| Resin 4 (4) | 586 | 5200 | 3 |
| Resin 5 (5) | 341 | 597 | 1.3 |
| Resin 6 (6) | 1370 | 7250 | 2.3 |
| Resin 7 (7) | 901 | 7076 | 2.6 |

(1) Resin 1: R 7578 P from SI group
(2) Resin 2: PICCOTAC 1105-E from Eastman
(3) Resin 3: HIKOREZ A-1100 from Kolon
(4) Resin 4: NOVARES TD 120 from Rutgers
(5) Resin 5: NOVARES TL 10 from Rutgers
(6) Resin 6: ESCOREZ 1102 type 1 from Exxon
(7) Resin 7: ESCOREZ 1102 type 2 from Exxon Table 1, by analysis of the commercial resins, shows that only resin 7 meets the criteria of the resin which may be used for the purposes of the invention, especially in comparison with resin 6 which another type of resin despite having the same commercial reference from the same company.

The resin preferably has a glass transition temperature Tg within a range extending from −50° C. to 100° C., more preferentially from 40 to 60° C. The Tg is measured according to ASTM D3418 (1999).

Preferably, the resin has a softening point within a range extending from 0 to 160° C., preferably from 90 to 110° C. The softening point is measured according to standard ISO 4625 (ring and ball method).

The resin preferably has an Mn within a range extending from 800 to 1000 g/mol.

The resin preferably has an Mz within a range extending from 6000 to 8000 g/mol.

The resin preferably has a PI within a range extending from 2.4 to 2.8.

The resin which may be used for the purposes of the invention may be selected from natural or synthetic resins. Among the synthetic resins, it may preferentially be selected from thermoplastic hydrocarbon-based resins which are aliphatic or aromatic, or else of the aliphatic/aromatic type, that is to say based on aliphatic and/or aromatic monomers. Suitable as aromatic monomer are, for example: styrene, α-methylstyrene, ortho-, meta- or para-methylstyrene, vinyltoluene, para-(tert-butyl)styrene, methoxystyrenes, chlorostyrenes, vinylmesitylene, divinylbenzene, vinylnaphthalene or any vinylaromatic monomer resulting from a C9 fraction (or more generally from a C8 to C10 fraction). Preferably, the vinylaromatic monomer is styrene or a vinylaromatic monomer resulting from a C9 fraction (or more generally from a C8 to C10 fraction). Preferably, the vinylaromatic monomer is the minor monomer, expressed as molar fraction, in the copolymer in question.

According to a particularly preferential embodiment, the resin which may be used for the purposes of the invention is selected from the group consisting of aliphatic hydrocarbon-based resins and the mixtures thereof, and especially from resins of homopolymers or copolymers of cyclopentadiene (abbreviated to CPD) or dicyclopentadiene (abbreviated to DCPD), resins of homopolymers or copolymers of a C5 fraction and mixtures thereof.

The content of resin is preferentially within a range extending from 1 phr to 15 phr, preferentially from 2 to 12 phr, even more preferentially from 3 to 10 phr, in particular from 3 to 8 phr. This is because, below 1 phr of the resin which may be used for the purposes of the invention, the composition could have problems of tack and hence of industrial processability, while above 15 phr the resin could modify the properties of rigidity and glass transition temperature of the composition.

I-5 Other Possible Additives

The rubber compositions in accordance with the invention optionally also comprise all or a portion of the normal additives generally used in elastomer compositions especially intended for the manufacture of treads, such as, for example, pigments, protective agents, such as antiozone waxes, chemical antiozonants or antioxidants, plasticizing agents other than those described above, anti-fatigue agents, reinforcing resins, or methylene acceptors (for example novolac phenolic resin) or donors (for example HMT or H3M).

The composition according to the invention may also comprise a plasticizing system. This plasticizing system may be composed of a hydrocarbon-based resin with a Tg of greater than 20° C., in addition to the specific hydrocarbon-based resin described above, and/or a plasticizing oil.

Of course, the compositions in accordance with the invention can be used alone or as a blend (i.e., as a mixture) with any other rubber composition which can be used for the manufacture of tyres.

It is obvious that the invention relates to the rubber compositions described above both in the "uncured" or non-crosslinked state (i.e., before curing) and in the "cured" or crosslinked, or also vulcanized, state (i.e., after crosslinking or vulcanization).

II—Preparation of the Rubber Compositions

The compositions are manufactured in appropriate mixers, using two successive phases of preparation which are well known to those skilled in the art: a first phase of thermomechanical working or kneading (sometimes referred to as "non-productive" phase) at high temperature, up to a maximum temperature of between 110° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the crosslinking or vulcanization system is incorporated; such phases have been described, for example, in Applications EP-A-0 501 227, EP-A-0 735 088, EP-A-0 810 258, WO00/05300 or WO00/05301.

The first (non-productive) phase is preferentially carried out in several thermomechanical steps. During a first step, the elastomers, the reinforcing fillers and the hydrocarbon-based resin (and optionally the coupling agents and/or other ingredients, with the exception of the crosslinking system) are introduced into an appropriate mixer, such as a customary internal mixer, at a temperature between 20° C. and 100° C. and preferably between 25° C. and 100° C. After a few minutes, preferentially from 0.5 to 2 min, and a rise in the temperature to 90° C. or to 100° C., the other ingredients (that is to say, those which remain, if not all were put in at the start) are added all at once or in portions, with the exception of the crosslinking system, during a mixing ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling the mixture thus obtained, the crosslinking system is then incorporated at low temperature (typically less than 100° C.), generally in an external mixer, such as an open mill; the combined mixture is then mixed (productive phase) for a few minutes, for example between 5 and 15 min.

The final composition thus obtained is subsequently calendered, for example in the form of a sheet or slab, in particular for laboratory characterization, or else extruded, in order to form, for example, a rubber profiled element used in the manufacture of semi-finished products for tyres. These products may then be used for the manufacture of tyres, according to techniques known to those skilled in the art, with the advantage of the invention, namely good tack of the layers on one another before curing of the tyre.

The crosslinking (or curing) is carried out in a known way at a temperature generally of between 130° C. and 200° C., under pressure, for a sufficient time which can vary, for example, between 5 and 90 min, as a function especially of the curing temperature, of the crosslinking system adopted, of the kinetics of crosslinking of the composition in question or else of the size of the tyre.

The examples which follow illustrate the invention without, however, limiting it.

III. Exemplary Embodiments of the Invention

III-1 Preparation of the Examples

In the examples which follow, the rubber compositions were produced as described above.

III-2 Characterization of the Examples

In the examples, the rubber compositions are characterized, before and/or after curing, as indicated below.

Green Tack (or Tack):

Tack is the ability of an assembly of unvulcanized mixtures to withstand a tearing stress.

A test device inspired by the probe tack tester (ASTM D2979-95) is used for measuring the green tack (tack). An Instron tensile testing machine comprising a fixed metal jaw and a mobile metal jaw is used. A first test specimen consisting of a 3 mm thick film of mixture is adhered to the fixed jaw. A second test specimen consisting of a 3 mm thick film of mixture is adhered to the mobile jaw. The films of mixture are adhered to the surface of the metal jaws with a double-sided adhesive (Tesafix® 4970).

In order to prepare the test specimens of mixture, the films of mixture are obtained by calendering to a thickness of 3 mm. The test specimens are cut by means of a punch of 1 cm diameter.

The measurement principle consists of bringing the two films of mixture into contact for 5 seconds while applying a compressive force of 40 N. After this contact phase, they are separated by being driven by the crosshead of the tensile testing machine. The rate of displacement of the crosshead in this tearing phase is 1 mm/s. The displacement of the crosshead and the force are measured continuously as a function of time during the contact and tearing phases.

The green tack result is the measurement of the maximum force reached during tearing.

The results are expressed in base 100, that is to say that the value 100 is arbitrarily assigned to the best control, in order to subsequently compare the green tack of the various solutions tested; the higher the value, the stronger the green tack.

Dynamic Properties (after Curing):

The dynamic properties G* and tan($\delta$)max are measured on a viscosity analyser (Metravib V A4000) according to Standard ASTM D 5992-96. The response of a sample of vulcanized composition (cylindrical test specimen with a thickness of 4 mm and a cross-section of 400 mm$^2$), subjected to a simple alternating sinusoidal shear stress, at a frequency of 10 Hz, under variable temperature conditions, especially at 60° C., according to Standard ASTM D 1349-99, is recorded. A peak-to-peak strain amplitude sweep is carried out from 0.1% to 50% (outward cycle) and then from 50% to 1% (return cycle). The results made use of are the complex dynamic shear modulus (G*) and the loss factor (tan $\delta$). The maximum value of tan $\delta$ observed (tan($\delta$)max) and the difference in complex modulus ($\Delta$G*) between the values at 0.1% and at 50% strain (Payne effect) are shown for the return cycle. The lower the value for the tan($\delta$) max at 60° C., the lower will be the hysteresis of the composition and thus the lower will be the rolling resistance. The results are expressed in base 100, that is to say that the value 100 is arbitrarily assigned to the best control, in order to subsequently compare the tan($\delta$)max at 60° C. (that is to say the hysteresis—and hence the rolling resistance) of the various solutions tested.

III-3 Examples

The compositions are manufactured with introduction of all of the constituents onto an internal mixer, with the exception of the vulcanization system. The vulcanization agents (sulphur and accelerator) are introduced onto an external mixer at low temperature (the constituent rollers of the mixer being at approximately 30° C.).

The object of the examples presented in Table 2 is to compare the different rubber properties of control compositions (C1 to C7) with a composition C8 in accordance with the invention. The properties measured, before and after curing, are presented in Table 3.

TABLE 2

|  | C1 | C2 | C3 | C4 | C5 | C6 | C7 | C8 |
|---|---|---|---|---|---|---|---|---|
| NR (1) | 25 | 25 | 25 | 25 | 25 | 25 | 25 | 25 |
| BR (2) | 75 | 75 | 75 | 75 | 75 | 75 | 75 | 75 |
| Carbon black (3) | 65 | 65 | 65 | 65 | 65 | 65 | 65 | 65 |
| Resin 1 (4) | — | 5 | — | — | — | — | — | — |

TABLE 2-continued

|  | C1 | C2 | C3 | C4 | C5 | C6 | C7 | C8 |
|---|---|---|---|---|---|---|---|---|
| Resin 2 (5) | — | — | 5 | — | — | — | — | — |
| Resin 3 (6) | — | — | — | 5 | — | — | — | — |
| Resin 4 (7) | — | — | — | — | 5 | — | — | — |
| Resin 5 (8) | — | — | — | — | — | 5 | — | — |
| Resin 6 (9) | — | — | — | — | — | — | 5 | — |
| Resin 7 (10) | — | — | — | — | — | — | — | 5 |
| Antioxidant (11) | 2.5 | 2.5 | 2.5 | 2.5 | 2.5 | 2.5 | 2.5 | 2.5 |
| Stearic acid (12) | 3 | 3 | 3 | 3 | 3 | 3 | 3 | 3 |
| ZnO (13) | 4 | 4 | 4 | 4 | 4 | 4 | 4 | 4 |
| Accelerator (14) | 1.6 | 1.6 | 1.6 | 1.6 | 1.6 | 1.6 | 1.6 | 1.6 |
| Soluble sulphur | 0.8 | 0.8 | 0.8 | 0.8 | 0.8 | 0.8 | 0.8 | 0.8 |

(1) NR: Natural rubber
(2) BR: polybutadiene
(3) Carbon black Grade ASTM N375 (Cabot)
(4) Resin 1: R 7578 P from SI group
(5) Resin 2: PICCOTAC 1105-E from Eastman
(6) Resin 3: HIKOREZ A-1100 from Kolon
(7) Resin 4: NOVARES TD 120 from Rutgers
(8) Resin 5: NOVARES TL 10 from Rutgers
(9) Resin 6: ESCOREZ 1102 type 1 from Exxon
(10) Resin 7: ESCOREZ 1102 type 2 from Exxon
(11) N-(1,3-Dimethylbutyl)-N'-phenyl-p-phenylenediamine (Santoflex 6-PPD) from Flexsys and antiozone wax
(12) Stearin, Pristerene 4931 from Uniqema
(13) Zinc oxide, industrial grade - Umicore
(14) N-Cyclohexyl-2-benzothiazolesulphenamide (Santocure CBS from Flexsys)

TABLE 3

|  | C1 | C2 | C3 | C4 | C5 | C6 | C7 | C8 |
|---|---|---|---|---|---|---|---|---|
| Green tack (base 100) | 32 | 100 | 61 | 48 | 40 | 39 | 63 | 87 |
| tan(δ) max at 60° C. (base 100) | 100 | 118 | 98 | 100 | 114 | 101 | 98 | 101 |

Compared to the control compositions, it is noted that the composition C8 in accordance with the invention has an improved green tack/hysteresis compromise compared to all the controls and especially compared to the control C2 which, although it has a better green tack performance than the composition C8 in accordance with the invention, also has a higher hysteresis, detrimentally affecting the rolling resistance. It is also possible to note the large difference between the compositions C7 and C8, indicating that depending on the manufacturing version of one and the same resin, in this case ESCOREZ 1102, the properties may vary significantly, according to the precise Mn, Mz and PI characteristics of the resin. Here, the control composition C7 has a comparable hysteresis to the composition in accordance with the invention but a markedly poorer green tack. The composition C8 according to the invention therefore has the best performance compromise between the green tack and the rolling resistance, with as low a level of hysteresis as the control C1 without resin, and a high level of green tack.

The invention claimed is:

1. A rubber composition comprising at least one diene elastomer, a reinforcing filler, a crosslinking system and an aliphatic hydrocarbon-based resin,
   wherein said aliphatic hydrocarbon-based resin has a number-average molecular weight Mn of between 700 and 1000 g/mol, an average molecular weight Mz of between 6000 and 8000 g/mol and a polydispersity index PI of greater than 2.4.

2. The rubber composition according to claim 1, wherein the at least one diene elastomer is selected from the group consisting of essentially unsaturated diene elastomers.

3. The rubber composition according to claim 1, wherein the at least one diene elastomer is selected from the group consisting of polybutadienes, synthetic polyisoprenes, natural rubber, butadiene copolymers, isoprene copolymers and mixtures thereof.

4. The rubber composition according to claim 1, wherein a predominant diene elastomer is selected from the group consisting of polybutadienes, copolymers of butadiene and styrene, and natural rubber.

5. The rubber composition according to claim 1, wherein the reinforcing filler is selected from the group consisting of silicas, carbon blacks and mixtures thereof.

6. The rubber composition according to claim 1, wherein a content of reinforcing filler is within a range extending from 5 to 200 phr.

7. The rubber composition according to claim 6, wherein the content of reinforcing filler is within a range extending from 40 to 160 phr.

8. The rubber composition according to claim 1, wherein a content of the aliphatic hydrocarbon-based resin is within a range extending from 1 to 15 phr.

9. The rubber composition according to claim 8, wherein the content of the aliphatic hydrocarbon-based resin is within a range extending from 2 to 12 phr.

10. The rubber composition according to claim 9, wherein the content of the aliphatic hydrocarbon-based resin is within a range extending from 3 to 10 phr.

11. The rubber composition according to claim 10, wherein the content of the aliphatic hydrocarbon-based resin is within a range extending from 3 to 8 phr.

12. The rubber composition according to claim 1, wherein the Mn of the aliphatic hydrocarbon-based resin is between 800 and 1000 g/mol.

13. The rubber composition according to claim 1, wherein the PI of the aliphatic hydrocarbon-based resin is within a range extending from 2.4 to 2.8.

14. The rubber composition according to claim 1 further comprising a plasticizing system.

15. The rubber composition according to claim 14, wherein the plasticizing system comprises a hydrocarbon-based resin with a Tg of greater than 20° C., a plasticizing oil, or a combination thereof.

16. A tire comprising a composition according to claim 1.

* * * * *